United States Patent [19]
Ward

[11] 4,409,178
[45] Oct. 11, 1983

[54] FORMATION OF BEADED EDGES ON PLASTICS MATERIALS ARTICLES

[75] Inventor: Peter Ward, Leeds, England

[73] Assignee: Plastona (John Waddington) Ltd, England

[21] Appl. No.: 204,814

[22] Filed: Nov. 7, 1980

Related U.S. Application Data

[63] Continuation of Ser. No. 41,198, May 21, 1979, abandoned.

[30] Foreign Application Priority Data

May 31, 1978 [GB] United Kingdom ............... 24809/78

[51] Int. Cl.³ ...................... B29C 17/04; B29C 17/10
[52] U.S. Cl. .................................... 264/544; 264/550; 264/551; 264/553; 264/153; 264/163; 425/292; 425/298; 425/305.1
[58] Field of Search ............... 264/544, 550, 551, 553, 264/554, 153, 163; 425/292, 298, 305.1

[56] References Cited

U.S. PATENT DOCUMENTS

| | | | |
|---|---|---|---|
| 3,011,212 | 12/1961 | Marshall et al. | 264/553 X |
| 3,470,281 | 9/1969 | Knowles | 264/551 X |
| 3,548,459 | 12/1970 | Dockery | 425/292 |
| 3,917,788 | 11/1975 | Padovanni | 264/163 X |

*Primary Examiner*—Jan H. Silbaugh
*Attorney, Agent, or Firm*—Fred Philpitt

[57] ABSTRACT

A method of forming plastic sheet material into articles. The sheet is heated and is formed into the article in a mould. The mould parts sever the portion of the sheet which is to be formed into the article and at the peripheral edge of the said portion the mould parts squeeze the plastics material to cause it to flow outwardly into a bead cavity in which the material forms into a thickened bead.

9 Claims, 6 Drawing Figures

FORMATION OF BEADED EDGES ON PLASTICS MATERIALS ARTICLES

This is a continuation of application Ser. No. 41,198, filed May 21, 1979 and now abandoned.

This invention relates to the production of plastics material articles and in particular to the formation of beaded edges on plastics material articles, such as plastics material containers (cups and tubs) and lids for such containers, which are formed from sheet plastics material which has been produced for example by extruding or calendering.

With the increasing cost of oil, synthetic plastics materials, which are derived from oil, increase in price, and manufacture of moulded, plastics articles are constantly faced with the need to modify their production in order to mitigate against such increasing costs. In the field of thermoforming from sheet material, polystyrene and ABS (acryonitricle butadiene styrene) have been used extensively, but because of the cost of these materials, much attention has been given to the use of the polyolefins as substitutes because the polyolefins, in particular polypropylene, are less expensive. Polypropylene does not however lend itself easily to being thermoformed from sheet materials with, for example, tubs or containers for quantities of butter or margarine of the order of 250 grams, because such tubs or containers require to have a top edge of reasonable rigidity, effectively to receive a machine applied lid to close the tub or container. When ABS or polystyrene is used for such tubs or containers, the top edge can be made rigid (and rounded making it suitable for receiving the lid) by rim rolling the top edge region after forming the tub or container and removing it from the mould. Rim rolling involves the application of heated rolls to the top edge of the container to shape it and because of this, it is extremely difficult, if at all possible, to rim roll the edges of polypropylene tubs or containers. Polypropylene has a small, critical softening range below which the material is too rigid to rim roll and above which it is too soft to handle, which gives rise to the difficulties of rim rolling the material. In any event, the step of rim rolling, in being carried out separately from the thermoforming, represents an increase in the cost of producing the finished article, and in the second place, rim rolling, as compared to for example injection moulding is not an accurate method of production as there is only limited control over the final diameter of the rim rolled edge.

Another problem arises with the use of polypropylene sheet for the production of thermoformed articles, because polypropylene is less rigid than polystyrene or ABS. To achieve a container of polypropylene of rigidity comparable with a container of polystyrene or ABS, a sheet of greater initial thickness is used and it is subsequently drawn out into a lesser thickness in the region which is to form the top edge of the container for the satisfactory forming of such edge. This drawing out represents poor utilization of sheet.

Extruded plastics sheets which are formed into containers may typically be of the order of 20 to 55 thousands of an inch thick and whilst material of this caliper forms into the containers and lids satisfactorily by pressure forming using air pressure and/or by applying a vacuum to the sheet after it has been softened by heat, it has not been possible to provide a beaded edge to these articles which is of sufficient rigidity to facilitate the machine application of a lid thereto, to give the article the feel of rigidity at the periphery and to prevent the article, especially a cup or tub, from collapsing at the periphery when handled either by hand or by machinery, or when a lid is being applied thereto.

The present invention aims at providing plastics material articles, which are produced from plastics material sheet, with a peripheral bead which will lend additional rigidity to the periphery of the articles, and wherein the bead is formed when the articles are being formed from the sheet material.

According to the present invention there is provided a method of producing an article from plastics sheet material wherein the sheet material is heated and the heated material is formed into an article in a mould comprising mould parts which are brought together to sever the portion of the sheet material which is to form the article from the remainder of the sheet material, and the peripheral region of the severed portion is squeezed between the mould parts of cause the plastics material thereof to flow outwardly into a bead cavity in which the material forms into a thickened bead.

The said bead cavity or part of it may be outwardly of the line along which the said portion is severed from the sheet material, and the bead cavity may be defined in one mould part or jointly by the mould parts.

The sheet material preferably is a polyolefin, particularly but not exclusively polypropylene, and the mould parts will usually be cooled so as to effect cooling of the formed article. Polypropylene shrinks upon cooling and use is made of this feature of the material to achieve effective release of the article from the mould because the bead may be of greater dimension than the dimension of the line of severing of the sheet portion from the sheet material.

As the article shrinks upon cooling the bead will shrink out of the bead cavity (or partially out of it) facilitating removal thereof. If a material which does not shrink, or shrink substantially, is used, it should be of such resilience that the formed article can be sprung out of the mould without being damaged.

The bead cavity may be defined in one mould part or jointly by two mould parts and preferably there are vent passages leading from the bead cavity to atmosphere to enable the squeezed, flowing material to displace the air therefrom.

The remainder of the article may be formed before, during or after the formation of the bead depending upon the sequence of operations of the moulding machine, but in all cases the remainder of the article and the bead will be formed whilst in one mould cavity.

At least some of the parts of the article will be formed by fluid pressure e.g. air pressure and/or by the application of a vacuum to the mould cavity, and such air pressure forming may be assisted, conventionally, by the use of a forming plug.

The cooling of the mould may be effected by passing water or other collant through collant passages formed in the mould parts.

The mould will probably be of the multi-cavity type so that a plurality of articles are formed similarly and simultaneously.

An embodiment of the present invention will now be described, by way of example, with reference to the accompanying diagrammatic drawings, wherein.

Figure 2:
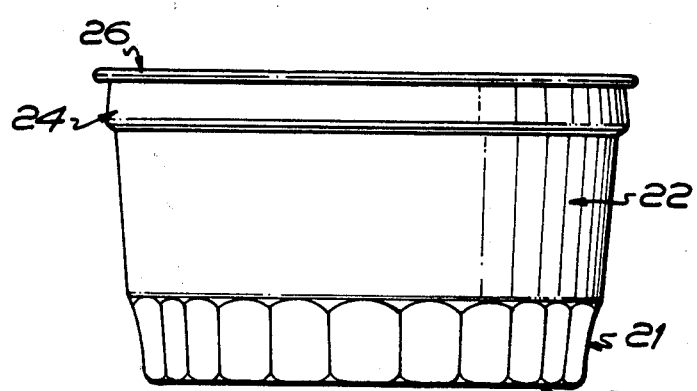
FIG. 2 shows a plastics material tub formed using the mould of FIG. 1.
Figure 3:
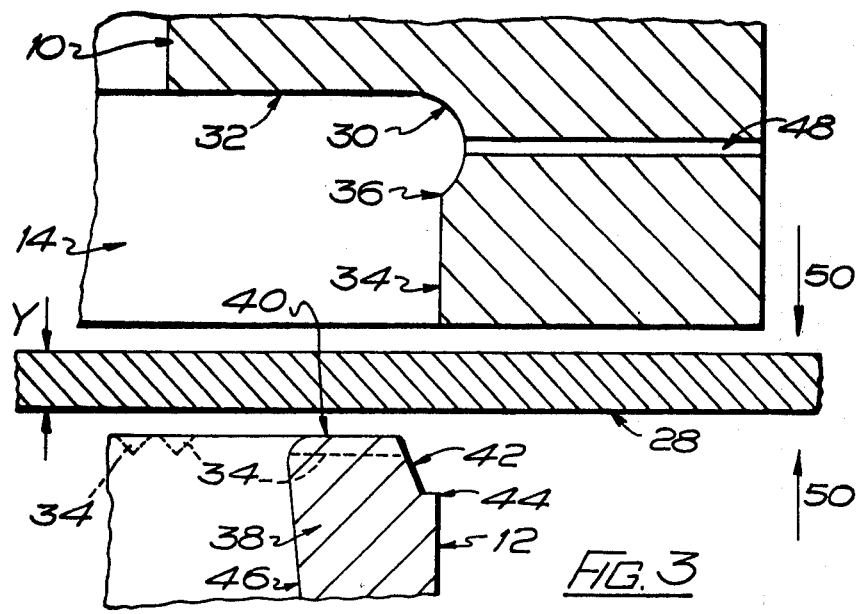
Figure 4:
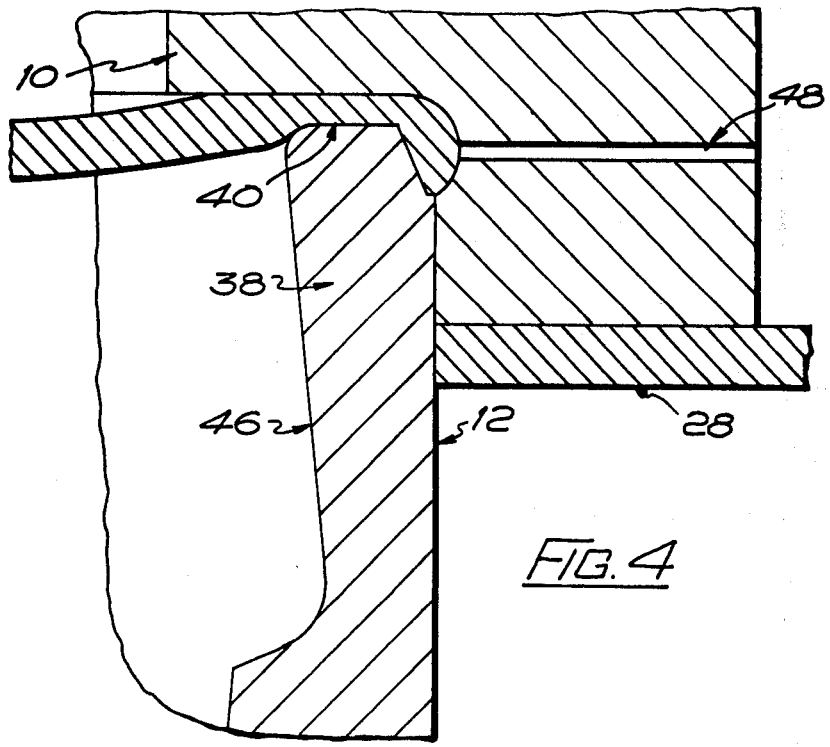
Figure 5:
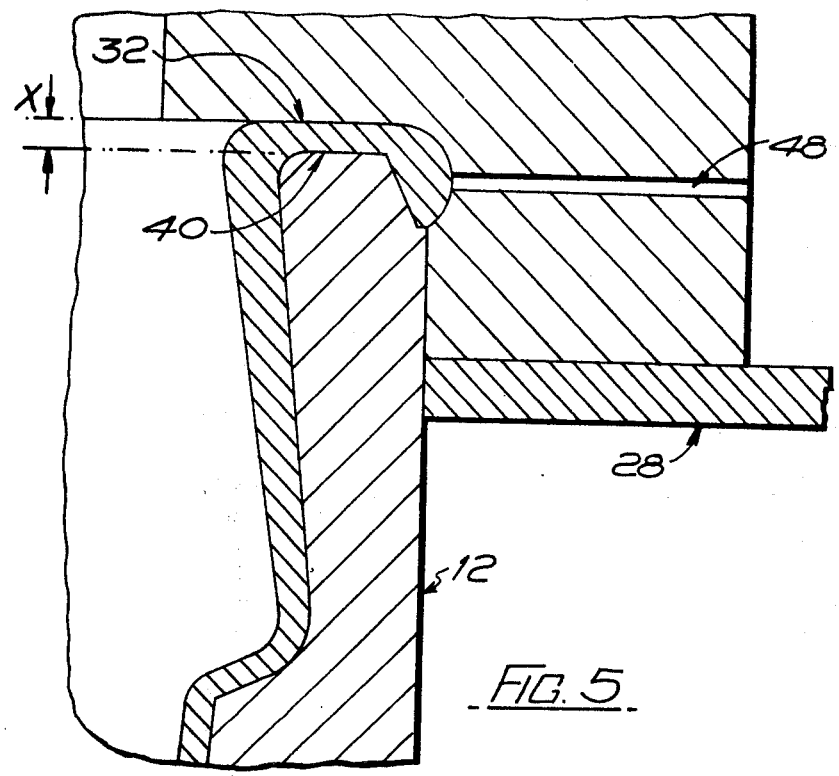
Figure 6:
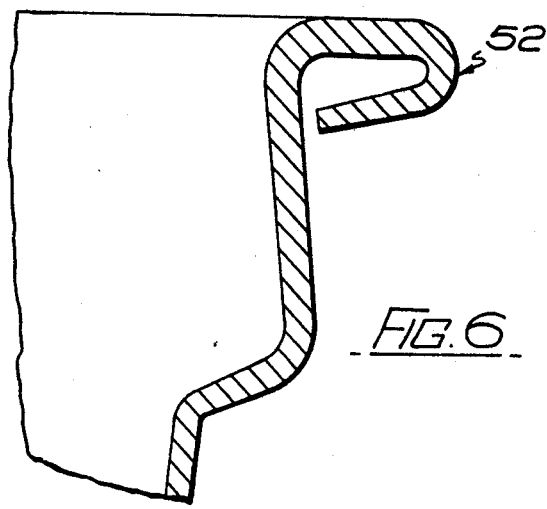

FIGS. 3, 4 and 5 respectively show the stages in the formation of the peripheral bead of the tub shown in FIG. 2;

FIG. 6 shows in sectional elevation the form of a rim-rolled flange of known configuration.

Figure 1:
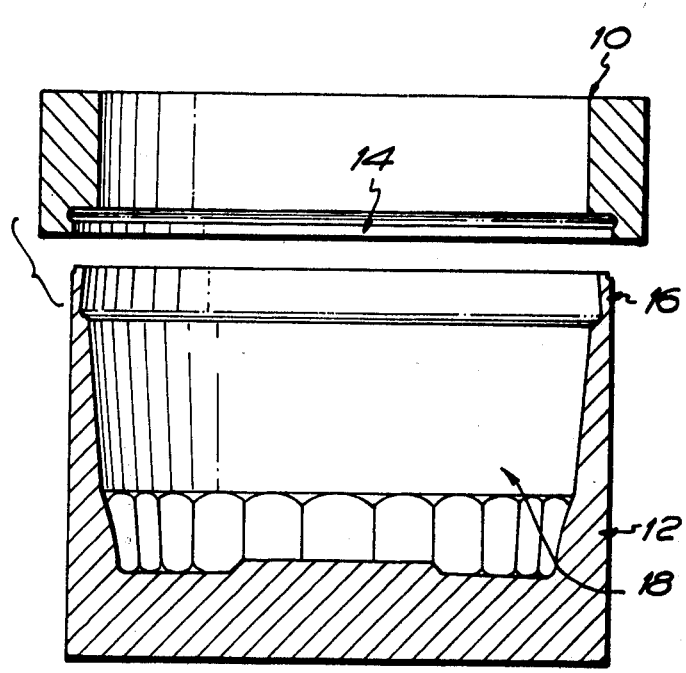
FIG. 1 shows in sectional elevation two mould parts for use in producing a thermoformed plastics material tub as shown in FIG. 2.

The mould which is shown in simplistic sectional elevation in FIG. 1 comprises a female mould ring 10 and a male mould part 12. These components are of circular section, but the invention can be applied to articles of other than circular configuration. The ring 10 has a recess 14 into which the top edge 16 of the mould part 12 fits, and the mould part 12 has a cavity 18 in which the body of the tub to be formed by the mould is formed by aire pressure forming as herein explained.

If reference is made to FIG. 2, it will be seen that the tub shown has a base 20 and a principle wall portion 22 of generally frusto-conical shape. The principle wall portion 22 is connected to the base by a decorative wall portion 21 and at the top of wall portion 22 is a denesting ring 24. This ring 24 is topped by a flange formation having a peripheral bead 26. The method of formation of the bead will now be explained in detail with reference to the FIGS. 3, 4 and 5.

In FIG. 3, the sheet material 28 from which the tub shown in FIG. 2 is formed of a thickness Y which may be for example of the order of 0.042 to 0.044 inches. FIG. 3 shows the material 28 positioned between the mould parts 10 and 12 or more particularly the regions of same which serve to form the beaded flange. It will be seen that the recess 14 has a bead recess 30 which is approximately semi-circular, and runs smoothly into a radial face 32, whilst the other side of the recess 30 meets an annular axial face 34 to provide a step 36. Recess 30 is of larger diameter than the face 34 as shown clearly in FIG. 3. The portion of the mould part 12 which is shown in FIG. 3 is an annular part 38 having a top flat face 40 and a chamfered frusto-conical notch 42 which forms a severing shoulder 44 where it meets the outer face of the annular part 38. The inner face 46 of the annular part 38 is reverse tapered to define the denesting ring 24. Vent passages 48 lead from the recess 30 to atmosphere for a purpose to be explained.

The sheet 28 in this example is of polypropylene which shrinks upon cooling, and it is to be mentioned that the mould parts 10 and 12 particularly in annular part 38 are water cooled. Water is circulated through cooling passages (not shown) in order to cool the mould parts. FIGS. 4 and 5 show how the bead 26 is formed. The material 28, when it is positioned between the mould parts 10 and 12 as shown in FIG. 3, has previously been heated so that it can be shaped to the form of the tub shown in FIG. 2 and to form the bead 26 the mould part 12 is moved towards mould part 10 as indicated by arrows 50 in FIG. 3. The face 40 initially engages the material and pushes it into the recess 14, until the severing shoulder 44 meets the lower edge of the mould part 10, when the shoulder 44 co-acting with the mould part 10 severs the portion of the material 28 which is to define the tub, as shown in FIG. 4. The movement together of the mould parts 10 and 12 continues until the peripheral region of the severed portion of the material 28 is engaged on opposite sides by the faces 32 and 40 as shown in FIG. 4. In actual fact the movement in the direction of arrows 50 continues until the spacing between the faces 32 and 40 (X in FIG. 4) is less than the initial thickness Y of the material so that the material is in fact squeezed, and will flow outwardly and into a bead cavity formed jointly by the recess 30 in mould part 10 and the notch 42 in mould part 12 as shown clearly in FIG. 4. The material which flows outwardly as a result of this squeezing action fills the bead cavity as shown in FIG. 4, so that a thickened bead is formed. The material flowing into the bead cavity displaces air therefrom and this air is free to flow out of the vent passages 48.

The remainder of the tub is formed by conventional thermoforming techniques, with or without plug assist, and such thermoforming takes place after the squeezing as aforesaid to produce the said bead. There is advantage in having this sequence of forming, because as the material at the periphery of the sheet portion to be formed into the tub, is squeezed and therefore gripped, in the subsequent forming of the tube body the material thins out more evenly as it is drawn down into the mould part 12. The thickening down of the material 28 is shown in FIG. 5.

The radial depth of the recess 30 outwardly from face 34 may be more than equal to or less than the amount by which the polypropylene defining the bead 26 shrinks upon being cooled in the mould so that the formed container will withdraw from the mould part 10 when the lower mould part 12 is moved in a direction opposite to direction 50 when the moulding operation has been complted, without the beaded rim being unacceptably damaged.

Instead of face 40 being parallel to face 32, it may be slightly angled so as more effectively to squeeze the material into the bead cavity.

The resulting tub as shown in FIG. 2 is therefore provided with a thickened peripheral bead which lends rigidity to the periphery of the container making it easier and better to handle, and the bead has been formed in a particularly effective simple manner. The embodiment of the invention described has particular advantage in that polypropylene shrinks when cooled, and the shrinkage takes the beaded edge at least partially out of the recess 30 enabling easy removal from the mould part 10. It is to be appreciated however that the invention can be applied with other materials and if materials (of which there are very few) which do not shrink on cooling are used, then care should be taken to ensure that the formed articles can be removed from the mould part, if a mould part of the configuration of mould part 10 is used. FIG. 6 is included to show a typical type of prior art peripheral edge formation. The edge formation is defined by a rim rolled portion 52 which is in fact formed after the article proper has been formed with a flat flange which subsequently is rim rolled to provide the portion 52.

In a typical example using polypropylene sheet of a caliper of 42 to 44 thousands of an inch thickness, the amount of squeezing of the material between the faces 32 and 40 would result in the thickness of material between said faces being of a thickness X in the range 18 to 22 thousandths of an inch, but the degree of squeezing will depend upon the material being used and its initial caliper. The face 40 may be provided with radial grooves as shown in dotted lines at 54 in FIG. 3 so as to form ribs on the underside of the plastics material between faces 32 and 40 in order to strengthen the plastics material in this region.

By manufacturing thermoformed plastics material produced from sheet material in accordance with the methods specifically described, certain advantages are obtained. Firstly, the formation of the peripheral bead takes place in the same mould as the formation of remainder of the container, and the operation is therefore a single stage as compared to two stage thermoforming and rim rolling. Secondly, by effectively moulding the bead by a local squeezing action. The moulding operation, as regards the bead, is dimensionally accurate, and a bead of predetermined outer diameter will be created. This accuracy of moulding is greater than in the rim-rolling technique. Thirdly, there is no need to thin down the material prior to moulding and the sequence of squeezing followed by formation of the tub body keeps good control of the thinning of the sheet material, making sheet utilisation much improved. It is a simple matter to form the bead forming recess with a curved surface so that the outer side of the bead in the finished article will be rounded to facilitate reception of a lid which is snapped thereonto.

I claim:

1. A method of producing an article with a beaded edge from a heated plastics sheet material wherein the article is formed in a mold, the method including the steps of:
   (a) locating the heated plastics sheet material between spaced complimentary male and female mold parts of the mold in which the article is formed;
   (b) bringing the mold parts together and severing from the sheet by such action a flat blank of the plastics sheet material from which the whole article is produced;
   (c) continuing the movement together of the mold parts after said severing with the blank still in flat form until the blank engages the base of the female mould part when the female and male mould parts squeeze the blank on opposite sides in a continuous annular edge region of said severed portion adjacent the line along which the said blank was severed from the remainder by means of faces of the mold parts which are directly opposite in the direction of movement together of the mold parts so that the plastics material where squeezed is reduced in thickness and the displaced material is displaced outwardly into a bead cavity defined by the mold and located outwardly of the said edge region;
   (d) continuing to squeeze the sheet material until the bead cavity is completely filled with displaced plastics material so that the said bead will have a pre-determined cross-sectional shape; and
   (e) forming the article in the mold.

2. A method according to claim 1 wherein at least a part of said bead cavity lies outwardly of the line along which said portion is severed from the sheet material.

3. A method according to claim 1 or claim 2 wherein the bead cavity is defined jointly by the mold parts.

4. A method according to claim 3 wherein the sheet material is a polyolefin and the mold parts are cooled so as to effect cooling of the formed article.

5. A method according to claim 1 or claim 2 wherein there is at least one vent passage leading from the bead cavity to the atmosphere to enable the squeezed, flowing material to displace the air therefrom.

6. A method according to claim 1 or claim 2 wherein the sheet material is of a thickness in the range of 20 to 55 thousandths of an inch.

7. A method according to claim 1 or claim 2 wherein the mold is of the multi-cavity type and forms a plurality of said articles similarly and simultaneously from the same sheet of plastics material.

8. A method according to claim 1 or claim 2 wherein the bead cavity is defined by a substantially semi-circular recess in one mold part and a chamfered surface leading to a shoulder on the other mold part.

9. A method according to claim 1 or claim 2 wherein the remainder of the article is formed by fluid pressure after the said peripheral region has been squeezed in order that the severed portion will be gripped while the remainder of the said portion is thermoformed.

* * * * *